Patented Oct. 6, 1936

2,056,826

UNITED STATES PATENT OFFICE 2,056,826

ADHESIVE COMPOSITIONS

Frank M. Clark, Pittsfield, Mass., assignor to General Electric Company, a corporation of New York No Drawing. Application August 10, 1934, Serial No. 739,280

6 Claims. (Cl. 87—9)

The present invention comprises new organic compositions which, over a range of temperatures above and below room temperature, are of semi-solid, jelly-like or pasty consistency, having a high viscosity and generally are sticky or tacky in nature.

As a consequence of my present invention I have produced gel compositions which, as will hereinafter appear, have valuable characteristics, being in particular either difficult to ignite or being wholly non-inflammable. They may be employed as lubricants, for dielectric and insulating purposes in electrical devices and as adhesive media in gas-cleaning apparatus.

In my prior patents 1,931,455; 1,935,595; 2,012,300, and 2,012,302; and in pending application Serial No. 664,359; the latter being filed on April 4, 1933, I have described various compositions consisting wholly or in part of compounds having a double ring structure, for example, chlorinated diphenyl, and compounds having a more complex structure, comprising both ring or aromatic groups and also one or more aliphatic groups. For example, chlorinated diphenyl methane, chlorinated diphenyl ketone, and chlorinated dibenzyl belong to the latter class. Such halogenated polyphenyl compounds range from mobile liquids of low viscosity to hard solids, the compounds as a rule becoming less fluid and finally being hard solids as the content of chlorine or other halogen is increased. The semi-solid compounds do not have the soft consistency of a grease, being rather of the nature of viscous liquids. For some industrial purposes a material is desired having a jelly-like consistency while not capable of flowing as a liquid. For example, for some forms of lubricating service, a semi-solid grease is desired. For some operations for cleaning gases a highly adhesive soft paste is desired to provide a surface upon which solid particles carried by the gases will lodge and remain.

I have found that halogenated hydrocarbon compounds can be caused to assume the desired soft, non-fluid consistency by associating such halogenated compound or a mixture thereof with a soap, or other suitable gelatinizing agent, and by agitation or otherwise converting the mixture to a gel state.

Contrary to what might be expected, the physical properties of the gel compositions made in accordance with my invention in many cases bear no simple relation to the physical properties of the halogenated compounds forming their main base. For example, a gel containing as a base chlorinated diphenyl of 60% chlorine content has a lower flow point than a gel containing as a base the same amount of chlorinated diphenyl of 54% chlorine content. The flow point of these two base materials would lead one to expect just the opposite result as the flow point of the diphenyl of 60% chlorine content is materially higher than the flow point of the diphenyl having 54% chlorine content.

In preparing the gels, greases or pastes of my invention I may employ as gelatinizing agent the soaps of a fatty acid, as for example, oleic, stearic or palmitic acid and a suitable base metal, as for example, aluminum, lead, zinc or sodium. About three to fifteen percent by weight of the soap is slowly added to the material to be converted to a gel, the mixture being energetically stirred to disperse the soap in the polyphenyl compound. The material to be converted to a gel should be heated to an initial temperature of about 100° C. and the temperature should be slowly raised to about 150° C. Stirring is continued until a homogeneous blend is obtained with the formation of a gel.

Following are specific examples illustrating my invention. A chlorinated diphenyl containing 60% chlorine (flow point 30° C.) when jellified with about 3% of aluminum stearate forms a product having the following characteristics:

Flow point_____° C__ 28
Viscosity at 150° C_____centipoise__ 135
Viscosity at 100° C_____centipoise__ 1700
Penetration at —15° C_____mm__ 13
Physical condition at room temperatures_____White, tacky grease When about 10% of aluminum stearate is used as gelation agent the same chlorinated diphenyl forms a product having the following properties:

Flow point_____° C__ 72
Viscosity at 150° C_____centipoise__ 2000
Viscosity at 140° C_____centipoise__ 4000
Physical condition at room temperature_____White, tacky grease A chlorinated diphenyl containing about 54% of chlorine forms (flow point 10° C.) with 3% of aluminum stearate a gel product having the following characteristics:

Flow point_____° C__ 38
Viscosity at 85° C_____centipoise__ 1900
Viscosity at 100° C_____centipose__ 650
Physical condition at room temperature____
                                    White grease The 54% chlorinated diphenyl with 10% aluminum stearate forms a gel having the following properties:

Flow point_____° C__ 88
Viscosity at 135° C_____centipoise__ 4900
Viscosity at 150° C_____centipoise__ 1250
Physical condition at room temperature____
                              White soft grease The gels prepared from various halogenated liquids are non-inflammable, show no decrease in viscosity at high temperature upon aging or use and show no separation of the components. The gel products are non-oxidizing, and do not form acids or sludge during service.

As a constituent of the greases described properly selected mineral oil may be used. To retain the non-inflammable properties of the compound such oil must be carefully selected. Too great volatility tends to promote low temperature inflammability. Too little volatility leaves an inflammable residue on evaporation. The proper oil is one which possesses a distilling range in the distilling range of the chlorinated compound or compounds present. An example of such a composition is a mixture which consists by weight of 70% of chlorinated diphenyl containing 60% chlorine (flow point 30° C.), 15% by weight of mineral oil (viscosity 150 seconds at 100° C.) and 15% of a suitable soap, such as aluminum stearate. The oil and chlorine compound are heated together to 100° C. and the aluminum stearate is slowly added with continuous stirring. The temperature is slowly raised to 150° C. at which temperature the mass is stirred to a homogeneous mixture. Whereupon the mixture is cooled to room temperature. Such a composition possesses excellent characteristics for a wide range of application. It is non-inflammable and of good dielectric strength. Its flow point is high (105° C.), yet it retains its tacky characteristics at temperatures as low as minus 25° C. There is thus made available a non-inflammable dielectric material of high flow point which is well adapted for a pot head, cable joint or bushing filling compound. Its good lubricating characteristics make it well adapted for high temperature lubrication. Its tacky properties retained over a wide temperature range, its substantially odor-free character, its non-volatility and non-inflammability make it well adapted as an adhesive in air filters and the like.

Variation in the relative amounts of the constituents produce widely varying characteristics in the resultant greases. A thin grease is prepared by dissolving 44 parts by weight of properly selected mineral oil (viscosity 150 seconds at 100° C.) in 55 parts by weight of pentachlor diphenyl (isomeric mixture, flow point 10° C.) and stirring in at 100° C. one part by weight of lead stearate. The temperature is slowly increased and held at 150° C. with continuous stirring until homogeneity is obtained, and then cooling to room temperature. The product obtained is well suited for lubrication applications requiring a thin grease, switch lubrication being an example. Because of its high specific gravity such a lubricant serves well to withstand moisture and surface water. The product possesses the following characteristics:

Specific gravity at 100° C__  1.12
Viscosity at 37.8° C_seconds 2800
Fire-point_____ none at temperatures up to ° C. 400
Condition at minus 20° C___ soft, not hard or stiff
Pour-point_____ about ° C. 3

What I claim as new and desire to secure by Letters Patent of the United States is:

1. A soft, viscous dielectric material having a flow point approximating 100° C. and solidifying at a temperature below minus 25° C. said material consisting of a gel containing a preponderant proportion of solid chlorinated diphenyl, a minor proportion of mineral oil and a minor proportion of a soap.

2. A viscous, adhesive composition having a flow point above room temperature and comprising a preponderant proportion of chlorinated diphenyl containing at least about 60% chlorine and containing aluminum stearate as a minor constituent.

3. A soft, viscous composition having a flow point above room temperature consisting preponderantly of a base of chlorinated diphenyl of about 60 per cent chlorine content, a minor proportion of mineral oil and about three to fifteen per cent of a soap, said composition being substantially non-inflammable.

4. A non-inflammable, jelly-like, tacky, composition having a flow point of about 105° C. at temperatures as low as minus 25° C. and consisting of about 70% chlorinated diphenyl, of 60% chlorine content, of about 15% mineral oil which has a distilling range substantially coinciding with the distilling range of said diphenyl compound, and about 15% of aluminum stearate.

5. A homogeneous emulsion suitable for lubricating purposes consisting by weight of about 55 parts of pentachlor diphenyl, about 44 parts of mineral oil and about one part of a soap, said emulsion having a pour point of about 3° C. being heavier than water and being of soft, viscous consistency.

6. A viscous, adhesive composition having a flow point above room temperature and comprising a preponderant proportion of chlorinated compound of the class consisting of diphenyl, diphenyl methane, diphenyl ketone and dibenzyl, and having the property of 60 per cent chlorinated diphenyl of remaining soft and tacky below room temperature, and a soap as a minor constituent.

FRANK M. CLARK.

CERTIFICATE OF CORRECTION.

Patent No. 2,056,826.                                    October 6, 1936.

FRANK M. CLARK.

It is hereby certified that error appears in the printed specification of the above numbered patent requiring correction as follows: Page 1, first column, line 16, for the patent number "2,012,300" read 2,012,301; and that the said Letters Patent should be read with this correction therein that the same may conform to the record of the case in the Patent Office.

Signed and sealed this 22nd day of December, A. D. 1936.

Henry Van Arsdale
Acting Commissioner of Patents.

(Seal)